(12) United States Patent
Park (10) Patent No.: US 10,389,441 B2
(45) Date of Patent: Aug. 20, 2019

(54) OPTICAL SIGNAL MONITORING DEVICE OF WAVELENGTH DIVISION MULTIPLEXING BASED NETWORK

(71) Applicant: SOLiD, INC., Seongnam-si, Gyeonggi-do (KR)

(72) Inventor: Chiyoung Park, Anyang-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/811,029

(22) Filed: Nov. 13, 2017

(65) Prior Publication Data

US 2018/0069627 A1 Mar. 8, 2018

Related U.S. Application Data

(63) Continuation of application No. PCT/KR2016/003141, filed on Mar. 28, 2016.

(30) Foreign Application Priority Data

May 14, 2015 (KR) ........................ 10-2015-0067379

(51) Int. Cl.
*H04J 14/02* (2006.01)
*H04B 10/079* (2013.01)
*H04B 10/2575* (2013.01)

(52) U.S. Cl.
CPC . *H04B 10/07955* (2013.01); *H04B 10/07957* (2013.01); *H04B 10/25754* (2013.01); *H04J 14/0215* (2013.01); *H04J 14/0282* (2013.01)

(58) Field of Classification Search
CPC ........ H04B 10/07955; H04B 10/25754; H04B 10/07957; H04J 14/0282; H04J 14/0215
See application file for complete search history.

(56) References Cited

U.S. PATENT DOCUMENTS

| | | | |
|---|---|---|---|
| 6,215,763 B1* | 4/2001 | Doshi | H04Q 11/0005 370/216 |
| 7,505,683 B1* | 3/2009 | Lemieux | H04J 14/0221 379/395.01 |
| 2003/0048508 A1* | 3/2003 | Yu | H04B 10/506 398/91 |

(Continued)

FOREIGN PATENT DOCUMENTS

| | | |
|---|---|---|
| KR | 10-2010-0006405 A | 1/2010 |
| KR | 10-2010-0067526 A | 6/2010 |
| KR | 10-2014-0125335 A | 10/2014 |

OTHER PUBLICATIONS

International Search Report for PCT/KR2016/003141 dated Jul. 20, 2016.

*Primary Examiner* — Leslie C Pascal
(74) *Attorney, Agent, or Firm* — Sughrue Mion, PLLC (57) ABSTRACT

There is provided an optical signal monitoring device and an optical signal monitoring system of a wavelength division multiplexing based network including: an input unit configured to receive each of downlink signals and uplink signals; a wavelength division multiplexing filter configured to separate the downlink signals and the uplink signals by wavelength; an optical power measurement module configured to measure optical power of each signal separated by wavelength; and a controller configured to determine whether an optical signal is abnormal based on optical power information measured by the optical power measurement module.

6 Claims, 5 Drawing Sheets

(56) References Cited

U.S. PATENT DOCUMENTS

| | | | |
|---|---|---|---|
| 2008/0240710 A1* | 10/2008 | Nishioka | H04B 10/03 398/5 |
| 2010/0316373 A1* | 12/2010 | Chang | H04B 10/071 398/12 |
| 2014/0016930 A1* | 1/2014 | Smith | H04B 10/07955 398/38 |
| 2014/0363157 A1 | 12/2014 | Ruchet et al. | |
| 2015/0229389 A1* | 8/2015 | Kim et al. | H04J 14/02 398/17 |
| 2015/0349912 A1* | 12/2015 | Komi | H04J 14/025 398/34 |
| 2017/0279538 A1* | 9/2017 | Sone | H04B 10/2575 |
| 2018/0212748 A1* | 7/2018 | Liu | H04L 7/0075 |

\* cited by examiner

OPTICAL SIGNAL MONITORING DEVICE OF WAVELENGTH DIVISION MULTIPLEXING BASED NETWORK

CROSS-REFERENCE TO RELATED APPLICATIONS

This application is a Continuation of International Application No. PCT/KR2016/003141, filed Mar. 28, 2016, and claims priority from Korean Patent Application No. 10-2015-0067379, filed May 14, 2015, the contents of which are incorporated herein by reference in their entireties.

BACKGROUND

1. Field

The present invention relates to a method of detecting and managing an optical signal abnormality in a wavelength division multiplexing based network.

2. Description of the Related Art

Due to rapid diffusion of the Internet, existing voice and text-oriented services are transformed into video and data-oriented services, and requirements for a high-speed operation of a network are rapidly increasing. Since the existing copper wire-based network is difficult to provide services at a sufficient speed to a long distance, facilities must be placed forward in order to satisfy the above-mentioned requirements, and operation and management costs thereof are considerably burdensome.

As an alternative to overcome limitations of the copper wire-based network, a light-based network is emerging. Especially, a wavelength division multiplexing (WDM) based network, which can guarantee a wide bandwidth of 100 Mbps or more by allocating a unique wavelength to each, and can apply various types of protocols, has been researched and developed.

Each channel of the WDM need to have a light source of a specific wavelength. However, this requires a plurality of wavelengths to be managed, which makes it difficult to control temperature-sensitive optical components, and consequently degrades an economical efficiency of the WDM based network.

Therefore, in order to operate the WDM based network stably, it is necessary to manage wavelengths allocated to each channel and to develop stable optical components. In particular, wavelength management is a very important issue in the WDM based network, but is not easy.

SUMMARY

The present invention is directed to an optical signal monitoring device and an optical signal monitoring system for detecting an abnormality of an optical signal by wavelength in a wavelength division multiplexing based network.

According to an example embodiment of the present invention, an optical signal monitoring device of a wavelength division multiplexing based network may include: an input unit for receiving downlink signals and uplink signals from a multiplexing device on at least one baseband unit (BBU) side; a wavelength division multiplexing (WDM) filter for separating the downlink signals and the uplink signals by wavelength; an optical power measurement module for measuring optical power of each optical signal separated by wavelength in the WDM filter; and a controller for determining whether an optical signal is abnormal based on optical power information measured by the optical power measurement module.

In an example embodiment, the optical signal monitoring device may further include an optical switch device for selectively connecting one of a plurality of input terminals and the input unit between the input unit and the WDM filter, wherein the input unit may include the plurality of input terminals that can be connected to a plurality of optical cables, respectively.

In an example embodiment, the optical signal monitoring device may further include an analog-to-digital converter (ADC) for converting analog optical power information measured by the optical power measurement module into a digital signal between the optical power measurement module and the controller.

In an example embodiment, the controller may determine that the optical signal is abnormal when a value of the optical power measured by the optical power measurement module is different from a predetermined optical power reference value by a predetermined threshold value or more.

In an example embodiment, the controller may transmit optical power information per optical port and channel measured by the optical power measurement module to an external server.

Furthermore, according to another example embodiment of the present invention, an optical signal monitoring system of a wavelength division multiplexing based network may include: an optical coupler unit for dividing and combining some of downlink signals of at least one baseband unit (BBU) and some of uplink signals of at least one remote radio unit (RRU); and an optical signal monitoring device for receiving some of the downlink signals and some of the uplink signals from the optical coupler unit and separating them by wavelength, measuring optical power of each signal separated by wavelength, and determining whether an optical signal is abnormal based on the measured optical power.

In an example embodiment, the optical signal monitoring device may include: an input unit for receiving some of the downlink signals and some of the uplink signals from the optical coupler unit; a wavelength division multiplexing (WDM) filter for separating some of the downlink signals and some of the uplink signals by wavelength; an optical power measurement module for measuring optical power of each optical signal separated by wavelength in the WDM filter; and a controller for determining that a corresponding optical signal is abnormal when a value of the optical power measured by the optical power measurement module is different from a predetermined optical power reference value by a predetermined threshold value or more.

In an example embodiment, the optical coupler unit may include: a first optical coupler for dividing some of the downlink signals and some of the uplink signals; and a second optical coupler for combining the signals separated by the first optical coupler.

In an example embodiment, the optical coupler unit may be included in a multiplexing device on the BBU side connected to the BBU.

In an example embodiment, the optical signal monitoring system may further include a server for receiving optical power information per optical port and channel measured by the optical power measurement module from the controller and storing the optical power information.

According to an example embodiment of the present invention, optical power information of downlink signals and uplink signals of a wavelength division multiplexing passive optical network can be monitored to easily detect an abnormality of an optical signal by wavelength.

DETAILED DESCRIPTION OF EXEMPLARY EMBODIMENTS

Since the present invention may have diverse modified embodiments, preferred embodiments are illustrated in the drawings and are described in the detailed description. However, this does not limit the present invention within specific embodiments and it should be understood that the present invention covers all the modifications, equivalents, and replacements within the idea and technical scope of the present invention.

In the description of the present invention, certain detailed explanations of the related art are omitted when it is deemed that they may unnecessarily obscure the essence of the present invention. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software or a combination of hardware and software.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Reference will now be made in detail to embodiments, examples of which are illustrated in the accompanying drawings.

Figure 1:
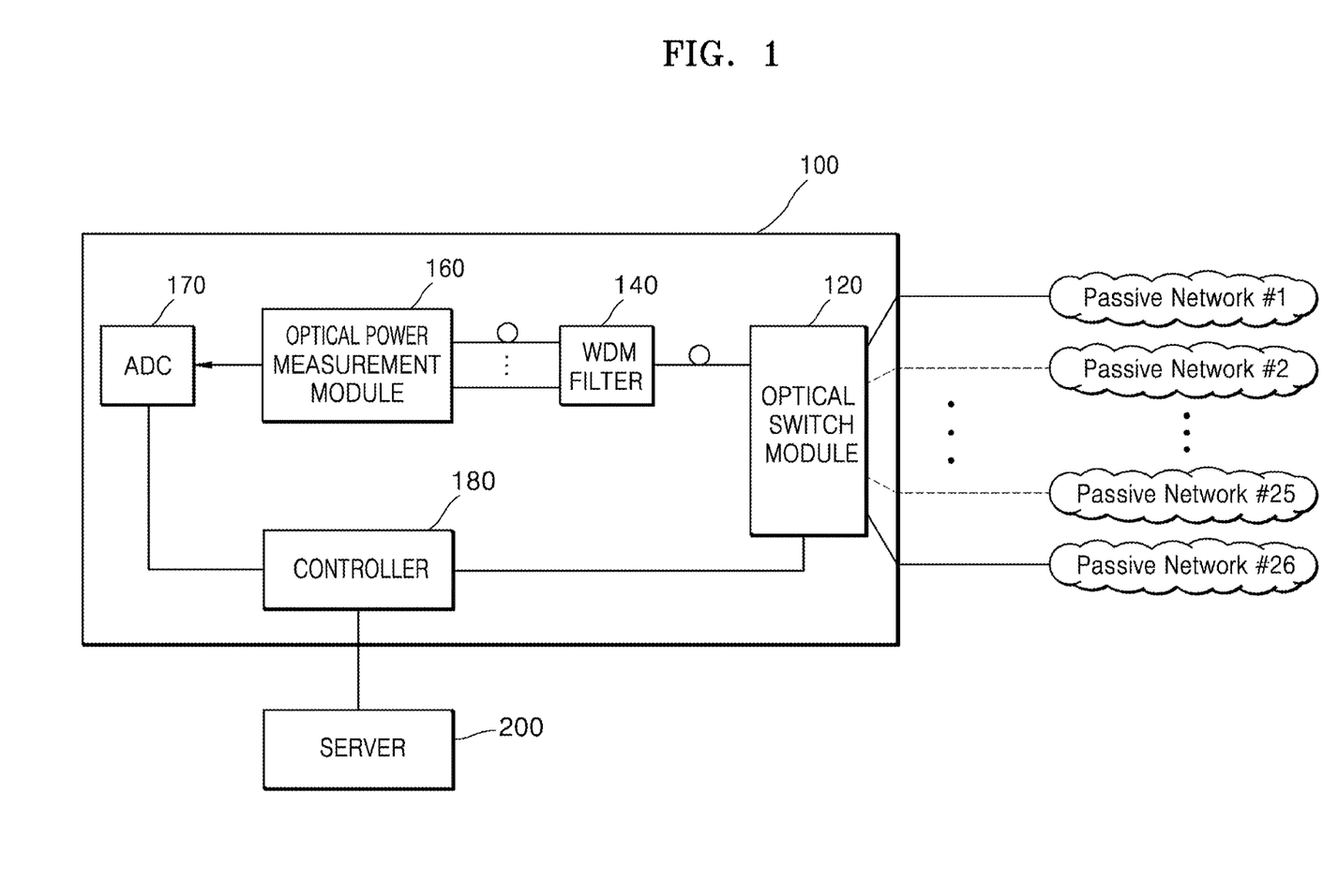
FIG. 1 is a configuration diagram of an optical signal monitoring device and an optical signal monitoring system of a wavelength division multiplexing based network, according to an example embodiment of the present invention.

FIG. 1 is a configuration diagram of an optical signal monitoring device and an optical signal monitoring system of a wavelength division multiplexing based network, according to an example embodiment of the present invention.

Referring to FIG. 1, an optical signal monitoring device 100 includes an optical switch module 120, a wavelength division multiplexing (WDM) filter 140, an optical power measurement module 160, an analog-to-digital converter (ADC) 170, and a controller 180.

The optical signal monitoring device 100 may be connected to an external server 200 through a network such as Ethernet. Although Ethernet is shown as an example, the present invention is not limited thereto and any wired or wireless network may be used as long as it is available.

The server 200 may store optical power information measured by the optical signal monitoring device 100 (that is, information about intensity of an optical signal), and may provide the optical power information to a user such that the user may monitor the optical power information in real time in a graphical user interface (GUI) form. The server 200 may include a memory and a display for this.

A plurality of passive networks (passive Network #1 to passive Network #26) may be connected to the optical signal monitoring device 100. FIG. 1 shows an example in which a total of 26 passive networks (passive network #1 to passive network #26) are switched and connected to the optical switch module 120. Although not shown in FIG. 1, a plurality of passive networks may be connected to a plurality of input terminals 110 of the optical signal monitoring device 100 through optical cables, respectively (see FIG. 4).

A passive network refers to a passive wavelength division multiplexing based network that includes at least one baseband unit (BBU) and at least one remote radio unit (RRU).

The optical switch module 120 may be connected to the WDM filter 140 through a single optical cable. Also, the optical switch module 120 is respectively connected to a plurality of passive networks through a plurality of optical cables for selective switching. As described above, the plurality of optical cables connected from the passive networks are connected to the optical switch module 120 through the plurality of input terminals 110, respectively. That is, the optical switch module 120 selectively switches an optical port to be monitored by the optical signal monitoring device 100 under the control of the controller 180. Since the optical switch module 120 is widely used, detailed descriptions thereof will not be given herein.

The WDM filter 140 separates downlink signals and uplink signals transmitted from the optical switch module 120 by wavelength, and connects the signals to the optical power measurement module 160 through each optical path. The WDM filter 140 may generally have a coarse wavelength division multiplexing (CWDM) method or a dense wavelength division multiplexing (DWDM) method. In wavelength division of optical cables, the CWDM method is a transmission method with wide channel spacing of 20 nm, and the DWDM method is a transmission method with narrow channel spacing of usually 0.8 nm or 0.4 nm. In the present invention, as an example, a CWDM filter is used as the WDM filter 140 and a total of 14 wavelength signals are multiplexed.

The optical power measurement module 160 may measure an optical power level of each optical signal separated and transmitted by wavelength from the WDM filter 140.

The WDM filter 140 distributes a total of 14 wavelength signals and connects the distributed 14 wavelength signals to the optical power measurement module 160 through 14 optical channels (or optical cables). The optical power measurement module 160 may include a photodiode (PD) or the like.

The ADC 170 converts an analog optical power signal measured by the optical power measurement module 160 into a digital signal and transmits the digital signal to the controller 180. The ADC 170 and the controller 180 may be connected to each other by an I2C communication method.

The controller 180 determines whether an optical signal is abnormal based on optical power level information changed to a digital signal by the ADC 170. The controller 180 may be connected to the optical switch module 120 by a serial peripheral interface (SPI) communication method or the like and may control the optical switch module 120 to select an optical port connected to a passive network and monitor an optical of a selected passive network.

Figure 2:
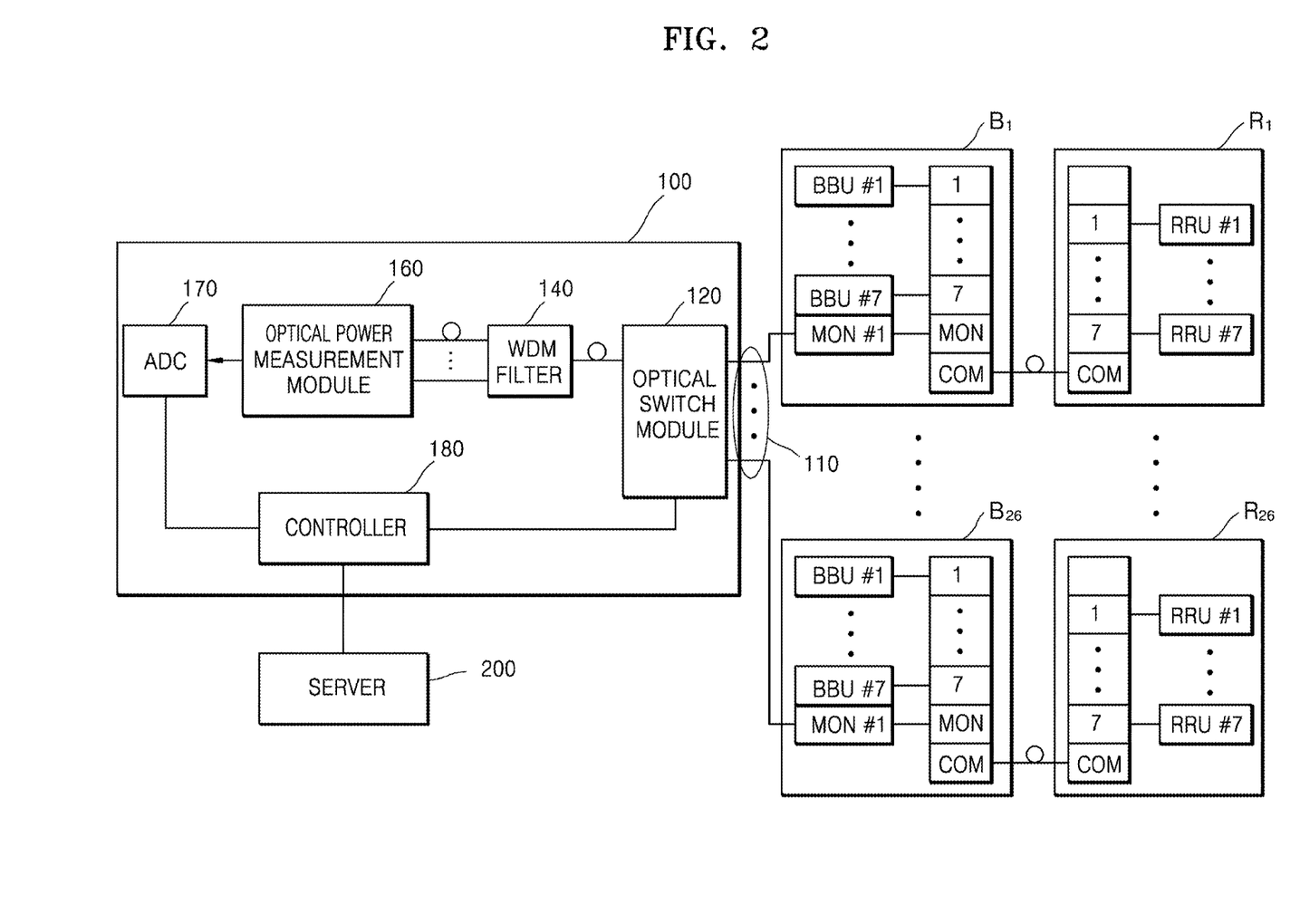
FIG. 2 is a detailed view of a passive network according to an example embodiment of the present invention.

For example, FIG. 2 shows a case where 26 passive networks are connected to the optical switch module 120 through a total of 26 optical cable lines. The controller 180 controls the optical switch module 120 to sequentially switch the optical cable lines according to conditions. A switching condition may follow a predetermined rule. For example, the switching condition may be predetermined such that optical cable lines can be sequentially switched in order based on the name or number of a network.

Furthermore, the controller 180 may be connected to the external server 200 through a network such as Ethernet as described above, may transmit optical power level information to the server 200, and may control switching of the optical switch module 120 according to a user's command transmitted from the optical switch module 120.

FIG. 2 is a detailed view of a passive network according to an example embodiment of the present invention. Since a detailed configuration of the BBU and the RRU of each passive network is already well known, a detailed description thereof will not be given herein.

FIG. 2 shows that the BBU and the RRU of each passive network communicates with each other by being multiplexed and de-multiplexed into seven wavelength signals, respectively. That is, a multiplexing device $B_1$ on the BBU side includes multiplexing ports 1 to 7 of a total of seven wavelength signals, a monitoring port MON connected to the optical signal monitoring device 100, and a connection port COM connected to a multiplexing device $R_1$ on the RRU side. The multiplexing port 1 is connected to a BBU #1, and the multiplexing port 7 is connected to a BBU #7. The seven wavelength signals are multiplexed into one signal and are transmitted to the multiplexing device $R_1$ on the RRU side through an optical cable. After the seven wavelength signals are de-multiplexed, the seven wavelength signals are transmitted to RRU #1 to RRU #7 through multiplexing ports 1 to 7 of the multiplexing device $R_1$, respectively.

In the example of FIG. 2, the optical signal monitoring device 100 may monitor a total of the BBUs and RRUs of the 26 passive networks because a total of 26 optical cables can be connected to a total of 26 input terminals 110, respectively. The input terminals 110 of the optical signal monitoring device 100 may be set differently depending on a status such as the number of networks.

In the above description, seven wavelength signals in the multiplexing device on the BBU side and seven wavelength signals in the multiplexing device on the RRU side, that is, 14 wavelength signals are multiplexed through the WDM filter 140. However, the number of wavelengths that can be processed by the WDM filter 140 may be set differently depending on the number of necessary channels.

A method of monitoring an optical power level of the optical signal monitoring device 100 of the present invention will be described in detail later below with reference to FIG. 3.

Figure 3:
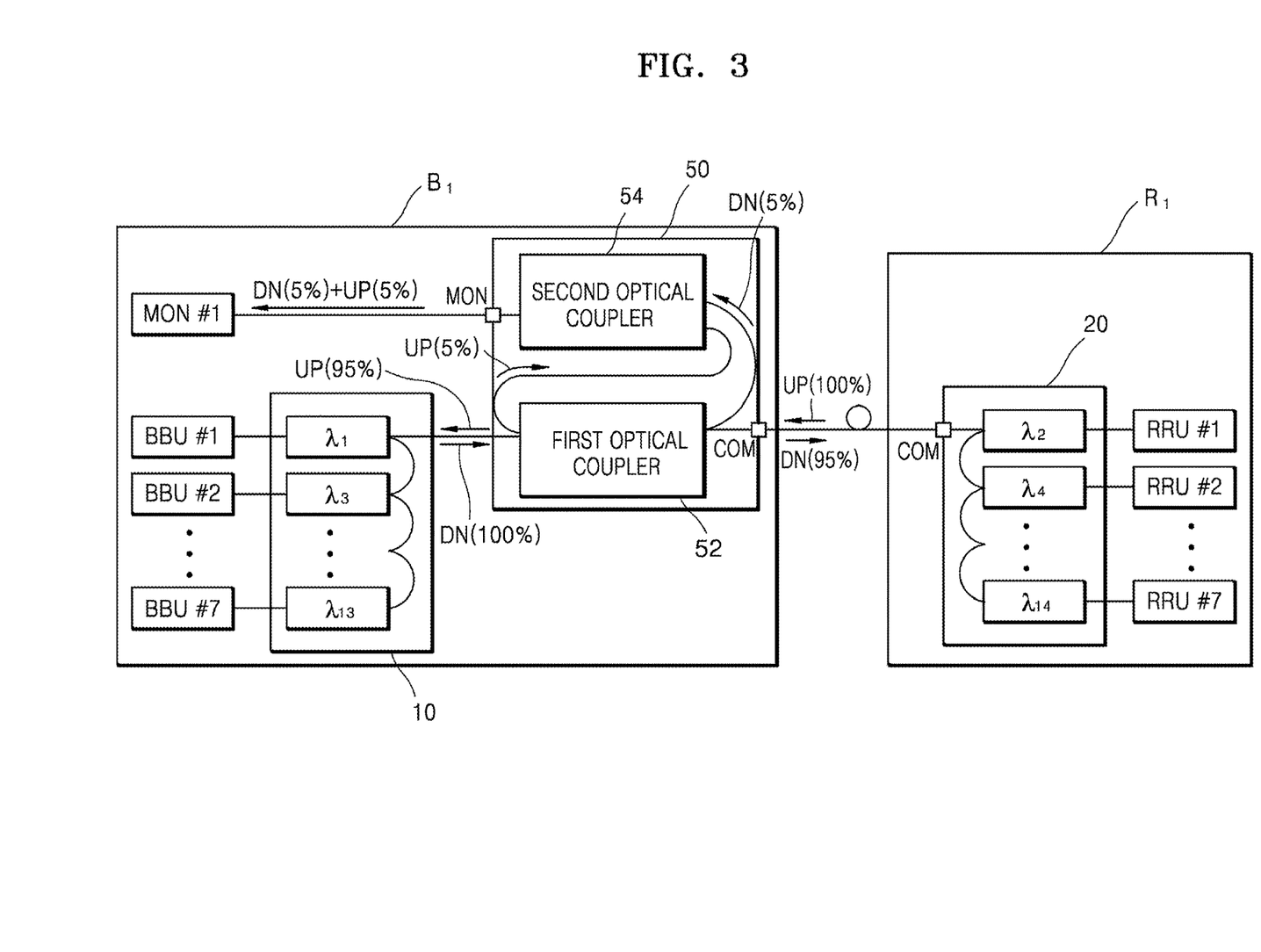
FIG. 3 is view of a multiplexing device on a baseband unit (BBU) side and a multiplexing device on a remote radio unit (RRU) side.

FIG. 3 is a view of a multiplexing device on the BBU side and a multiplexing device on the RRU side.

As described above, an optical cable is connected from the input terminals 110 of the optical signal monitoring device 100 and the optical cable may be connected to a monitoring port MON #1 of the multiplexing device $B_1$ on the BBU side. The optical signal monitoring device 100 may determine whether an optical signal is abnormal by detecting optical power of each optical signal after receiving downlink signals and uplink signals from the monitoring port MON #1.

Referring to FIG. 3, the multiplexing device $B_1$ on the BBU side may include a WDM filter 10 connected to each of the BBUs (BBU #1 to BBU #7), and an optical coupler 50 connected to the WDM filter 10 for transmitting some of downlink signals and uplink signals to the optical signal monitoring device 100. Furthermore, the multiplexing device $R_1$ on the RRU side may include a WDM filter 20 connected to each RRUs (RRU #1 to RRU #7).

A total of 14 signals of different wavelengths $\lambda_1$, $\lambda_3, \ldots, \lambda_{14}$ are respectively allocated to the BBUs (BBU #1 to BBU #7), and the 14 signals of different wavelengths may be multiplexed into one signal in the WDM filter 10 and transmitted to the multiplexing device $R_1$ on the RRU side through the optical coupler 50. That is, the BBU #1 may transmit the signal of wavelength $\lambda_1$ to the RRU #1, and may receive the signal of wavelength $\lambda_2$ from the RRU #1. Likewise, the BBU #7 may transmit the signal of wavelength $\lambda_{13}$ to the RRU #7, and may receive the signal of wavelength $\lambda_{14}$ from the RRU #7.

The optical coupler 50 may include a first optical coupler 52 and a second optical coupler 54. The first optical coupler 52 may divide the downlink signals and uplink signals at a ratio of n:m and transmit the signals of a predetermined ratio to the second optical coupler 54 (n and m are real numbers less than 100, and n+m may be 100). For example, it is assumed that n is set to 95, m is set to 5, and m is preset to be transmitted to the second optical coupler 54. When downlink signals are input from the WDM filter 10 of the multiplexing device $B_1$ on the BBU side, the first optical coupler 52 may separate 5 [%] of the input downlink signals and output it to the second optical coupler 54. 95 [%] of the input downlink signals may be transmitted to the multiplexing device $R_1$ on the RRU side. In addition, when uplink signals are input from the WDM filter 10 of the multiplexing device $R_1$ on the RRU side, the first optical coupler 52 may separate 5 [%] of the input uplink signals and output it to the second optical coupler 54. 95 [%] of the input uplink signals may be transmitted to the multiplexing device $B_1$ on the BBU side.

The second optical coupler 54 may combine the downlink signals and uplink signals at the m proportion transmitted from the first optical coupler 52 at a predetermined ratio (for example, 50:50 ratio) and transmit the combined signals to the optical signal monitoring device 100 through the monitoring port MON #1. Therefore, signals transmitted and received may be monitored in real time without causing a large change in the downlink signals and the uplink signals.

Although the first optical coupler 52 divides the downlink signals and uplink signals at a ratio of 95:5, and the second optical coupler 54 combines the downlink signals and uplink signals at a ratio of 50:50 in the above description, the division ratio of the first optical coupler 52 and the coupling ratio of the second optical coupler 54 may be set differently depending on a situation. Therefore, the division ratio of the first optical coupler 52 and the combination ratio of the second optical coupler 54 do not limit the scope of the present invention.

Furthermore, the multiplexing device $R_1$ on the RRU side de-multiplexes downlink signals transmitted through the optical coupler 50 through the WDM filter 20 and allocates the downlink signals to the RRUs (RRU #1 to RRU #7), respectively. In more detail, the optical coupler 50 distributes some of downlink signals of seven wavelengths transmitted from the multiplexing device $B_1$ on the BBU side to the multiplexing device $R_1$ on the RRU side and transmits the downlink signals to the WDM filter 20. The WDM filter 20 of the multiplexing device $R_1$ on the RRU side de-multiplexes some of the distributed downlink signals of seven wavelengths and transmits the de-multiplexed signals to the RRUs (RRU #1 to RRU #7), respectively.

The controller 180 of the optical signal monitoring device 100 may determine whether a specific wavelength optical signal is abnormal by comparing an optical power level of the collected downlink signals and uplink signals with a predetermined threshold value.

Figure 4:
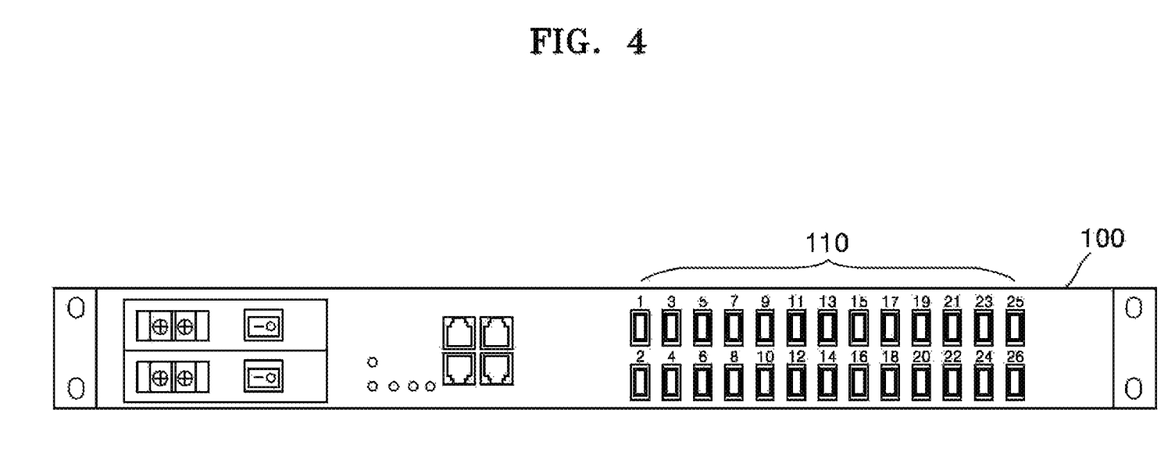
FIG. 4 is a view of an exemplary product of an optical signal monitoring device.

FIG. 4 is a view of an exemplary product of the optical signal monitoring device according to the present invention.

Referring to the exemplary product of FIG. 4, the optical signal monitoring device 100 is provided with the 26 input terminals 110 to which optical cable lines corresponding to the multiplexing device on the BBU side of each passive network can be connected. The 26 input terminals are connected to the optical switch module 120 of FIG. 1, and may monitor each optical signal of a passive network connected to each optical cable line while switching according to a control signal of the controller 180 and predetermined rules. As described above, the number of the input terminals 110 may vary. The detailed configuration of the optical signal monitoring device 100 has already been described with reference to FIGS. 1 and 2, and a detailed description thereof will not be given herein. Hereinafter, an operation of the controller 180 for detecting an abnormality of a specific wavelength optical signal will be described in detail with reference to FIG. 5.

Figure 5:
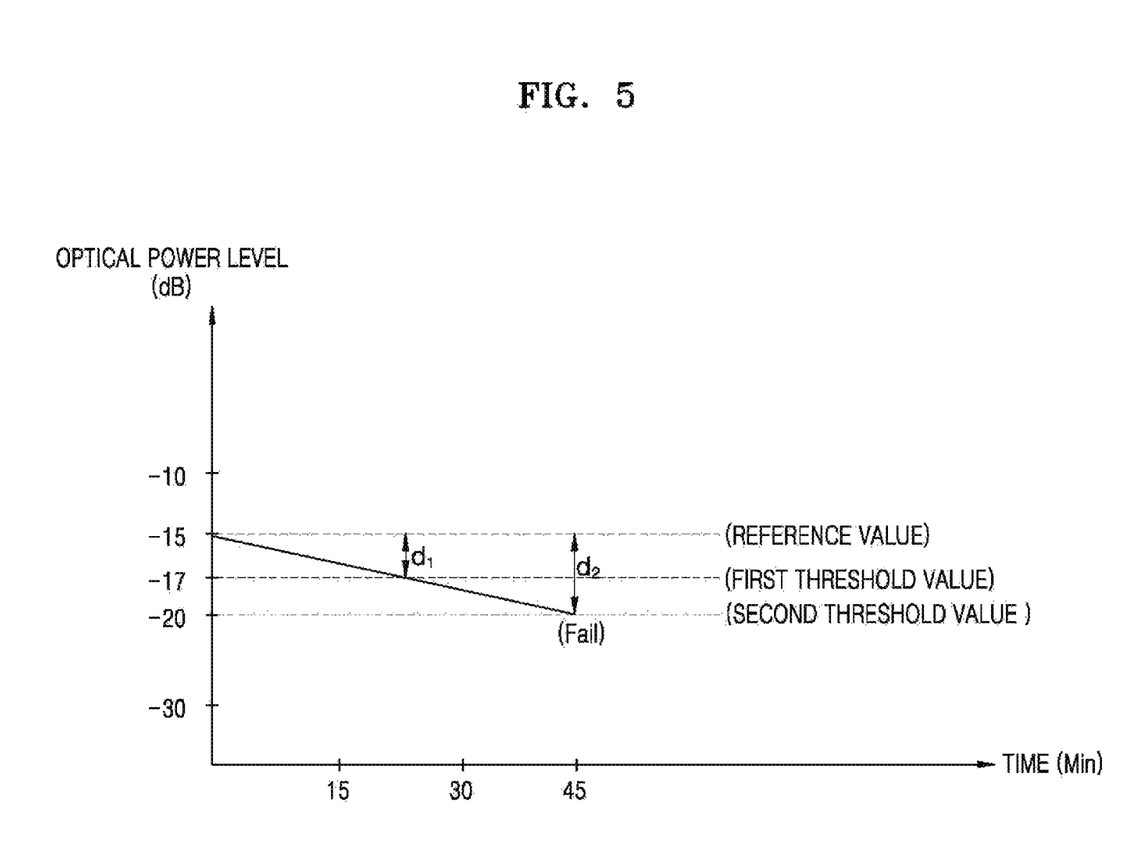
FIG. 5 is a view of an optical power level with time for explaining an optical signal monitoring operation of an optical signal monitoring device.

FIG. 5 is a view of an optical power level with time for explaining an optical signal monitoring operation of the optical signal monitoring device 100.

Optical power is measured by the optical power measurement module 160 as described in FIGS. 1 and 2. According to an example embodiment of the present invention, the optical power measurement module 160 may include PD. The optical power measurement module 160 may calculate gain or loss information of optical power of an optical signal incident on a photodetector in units of dB. Specifically, since initial optical power information of an optical signal by wavelength is stored in advance, the optical power measurement module 160 may calculate gain or loss information of optical power of an optical signal by comparing the optical power measured by the optical power measurement module 160 with the initial optical power information of the optical signal by wavelength stored in advance. If initial optical power of an optical signal of a specific wavelength is Pi and the optical power measured by the optical power measurement module 160 is Pm, the optical power level may be calculated by an equation of 10×log (Pm/Pi).

Referring to FIG. 5, as an example, −15 dBm is set as an optical power normal reference value, −17 dBm is set as a first threshold value, and −20 dBm is set as a second threshold value. If a value of an optical signal differs from the normal reference value by 2 dBm ($d_1$) or more, it can be determined that the optical signal is abnormal. If a value of an optical signal differs from the normal reference value by 5 dBm ($d_2$) or more, it can be determined that the optical signal has lost its function as a communication signal (i.e., communication failure, Fail).

In the graph of FIG. 5, when an optical power level of an arbitrary optical signal gradually decreases with time and becomes −17 dBm, the controller 180 determines that the optical signal is abnormal, and determines that communication has failed after 45 minutes when −20 dBm is detected. However, the reference value and the threshold value of FIG. 5 are only examples, and may be variously set according to the type and characteristics of a network.

If it is determined that the optical signal is abnormal or communication failure is detected, the controller 180 may control the server 200 to provide alarm information to a user. That is, the controller 180 may transmit the optical power information measured by the optical power measurement module 160 to the server 200 at predetermined time intervals. The server 200 may display the optical power information received from the controller 180 so that a user may check the optical power level in real time. The server 200 may output an alarm if the optical power level differs from the predetermined reference value by a threshold value or more so that a user may perceive the fact audibly.

An optical signal monitoring device and an optical signal monitoring system of a WDM based network according to the present invention may easily detect an abnormality of an optical signal by monitoring an optical power level of downlink signals and uplink signals using only an optical switch without expensive equipment.

While the embodiments have been particularly shown and described, it will be understood by those of ordinary skill in the art that various changes in form and details may be made therein without departing from the spirit and scope of the present invention as defined by the appended claims.

What is claimed is:
1. An optical signal monitoring device of a wavelength division multiplexing based network, the optical signal monitoring device comprising:
a wavelength division multiplexing (WDM) filter configured to receive downlink signals and uplink signals from one of a plurality of multiplexing devices on Baseband Unit (BBU) side, and separate the downlink signals and the uplink signals by wavelength;
an optical power measurer configured to measure optical power of each optical signal separated by wavelength in the WDM filter;
a controller configured to determine whether an optical signal is abnormal based on optical power information measured by the optical power measurer; and
an optical switch configured to selectively connect one of a plurality of optical cables and the WDM filter,
wherein each of the plurality of optical cables is connected to each of the plurality of multiplexing devices.
2. The optical signal monitoring device of claim 1, wherein the controller is configured to determine that the optical signal is abnormal when a value of the optical power measured by the optical power measurer is different from a predetermined optical power reference value by a predetermined threshold value or more.

3. The optical signal monitoring device of claim 2, wherein the controller is configured to transmit optical power information per channel measured by the optical power measurer to an external server.

4. An optical signal monitoring system of a wavelength division multiplexing based network, the optical signal monitoring system comprising:
   an optical coupler configured to:
      separate a portion from downlink signals of at least one baseband unit (BBU),
      separate a portion from uplink signals of at least one remote radio unit (RRU), and
      combine the separated portions; and
   an optical signal monitoring device comprising:
      a wavelength division multiplexing (WDM) filter configured to receive the combined portions from the optical coupler, and separate some of the downlink signals and some of the uplink signals from the combined portions by wavelength;
      an optical power measurer configured to measure optical power of each optical signal separated by wavelength in the WDM filter;
      a controller configured to determine that a corresponding optical signal is abnormal when a value of the optical power measured by the optical power measurer is different from a predetermined optical power reference value by a predetermined threshold value or more; and
      an optical switch configured to selectively connect one of a plurality of optical cables and the WDM filter,
      wherein the plurality of optical cables are respectively connected to a plurality of multiplexing devices each of which includes the optical coupler.

5. The optical signal monitoring system of claim 4, wherein the optical coupler comprises:
   a first optical coupler configured to separate the portion of the downlink signals of the at least one BBU, and separate the portion of the uplink signals of the at least one RRU; and
   a second optical coupler configured to combine the separated portions.

6. The optical signal monitoring system of claim 4, further comprising:
   a server configured to receive optical power information per channel measured by the optical power measurer from the controller and store the optical power information.

* * * * *